United States Patent
Schuh

(10) Patent No.: US 9,636,803 B2
(45) Date of Patent: May 2, 2017

(54) ACTUATING DEVICE

(75) Inventor: Bernhard Schuh, Nuremberg (DE)

(73) Assignee: DE-STA-CO Europe GmbH, Oberursel (DE)

(\*) Notice: Subject to any disclaimer, the term of this patent is extended or adjusted under 35 U.S.C. 154(b) by 153 days.

(21) Appl. No.: 13/817,101

(22) PCT Filed: Aug. 14, 2012

(86) PCT No.: PCT/DE2012/100239
§ 371 (c)(1),
(2), (4) Date: Jun. 15, 2014

(87) PCT Pub. No.: WO2013/023650
PCT Pub. Date: Feb. 21, 2013

(65) Prior Publication Data
US 2014/0291908 A1    Oct. 2, 2014

(30) Foreign Application Priority Data
Aug. 15, 2011    (DE) .................. 10 2011 110 129

(51) Int. Cl.
*B25B 5/12* (2006.01)
*B25B 5/16* (2006.01)
*F16F 9/14* (2006.01)

(52) U.S. Cl.
CPC ............. *B25B 5/122* (2013.01); *B25B 5/16* (2013.01); *F16F 9/145* (2013.01)

(58) Field of Classification Search
CPC  B25B 1/14; B25B 1/18; B25B 1/2468; B25B 5/122
USPC ........................................................ 269/32
See application file for complete search history.

(56) References Cited

U.S. PATENT DOCUMENTS

| 1,873,100 | A   |   | 8/1932  | Allen |
|-----------|-----|---|---------|-------|
| 4,240,620 | A   | * | 12/1980 | Tunkers ............. B25B 5/122 269/24 |
| 6,220,588 | B1  | * | 4/2001  | Tunkers ............. B25B 5/122 269/32 |
| 6,752,066 | B2  | * | 6/2004  | Varetto ............. B25B 5/122 92/17 |
| 6,997,447 | B2  | * | 2/2006  | Fukui ................. B25B 5/16 269/32 |

(Continued)

FOREIGN PATENT DOCUMENTS

| DE | 60203577 T2     | 1/2006 |
| DE | 102005049647 B3 | 6/2007 |

(Continued)

OTHER PUBLICATIONS

International Search Report and Written Opinion of the ISA, ISA/EP, Rijswijk, NL, mailed Nov. 20, 2012.

*Primary Examiner* — Larry E Waggle, Jr.
*Assistant Examiner* — Seahee Yoon
(74) *Attorney, Agent, or Firm* — Harness, Dickey & Pierce, P.L.C.

(57) ABSTRACT

An actuating device has a linearly-movable fluidly operated piston drive (1). A pivot shaft (3) is movably, rotatably mounted in a housing (2). A lever arm (4) is connected with the pivot shaft (3) in a torsionally rigid manner. An adjustment mechanism (5) connects the piston drive (1) with the pivot shaft (3). A damping device (6) dampens movement of the lever arm (4). The damping device (6) is associated with the housing (2) and with the pivot shaft (3).

10 Claims, 2 Drawing Sheets

(56) References Cited

U.S. PATENT DOCUMENTS

| | | | |
|---|---|---|---|
| 8,215,622 B2* | 7/2012 | Fukui | B25B 5/122 269/20 |
| 2002/0063371 A1 | 5/2002 | Takahashi et al. | |
| 2010/0044942 A1* | 2/2010 | Tamai | B25B 5/122 269/32 |
| 2012/0073392 A1* | 3/2012 | Balc | B25B 5/061 74/29 |

FOREIGN PATENT DOCUMENTS

| | | |
|---|---|---|
| EP | 1952946 A2 | 8/2008 |
| WO | 2011/058586 A1 | 5/2011 |

* cited by examiner

ACTUATING DEVICE

CROSS-REFERENCE TO RELATED APPLICATIONS

This application is a 371 U.S. National Stage of International Application No. PCT/DE2012/100239, filed Aug. 14, 2011, which claims the benefit and priority of German Patent Application No. 10 2011 110 129.6, filed Aug. 15, 2011. The disclosures of the above applications are incorporated herein by reference.

The disclosure relates to an actuating device for damping movement of a lever arm.

An actuating device is known according to DE 602 03 577 T2. It includes a piston drive, pivot shaft, lever arm, adjustment mechanism and a damping device. The piston drive is linearly-movably constructed and fluidly operated, in particular pneumatically, but if applicable also hydraulically, operated. The pivot shaft is movably rotatably mounted in a housing. The lever arm is connected with the pivot shaft in a torsionally rigid manner. The adjustment mechanism connects the piston drive with the pivot shaft. The damping device dampens the movement of the lever arm. In this solution, the damping device is arranged in a separate housing at the end of the piston drive facing away from the lever arm. The damping device includes a separate piston construction that is connected with the piston rod of the piston drive, via a rotating spindle. This construction requires several additional components to realize the damping movement. In addition, it takes up a large amount of space.

The disclosure improves the actuating device of the above mentioned type. In particular, a structurally simpler and more compact actuating device is disclosed.

According to the disclosure, an actuating device comprises a linearly-movable, fluidly operated piston drive. A pivot shaft is movably, rotatably mounted in a housing. A lever arm is connected with the pivot shaft in a torsionally rigid manner. An adjustment mechanism connects the piston drive with the pivot shaft. A damping device is associated with the housing and with the pivot shaft. The damping device dampens movement of the lever arm.

The damping device is constructed to be connected, on one hand, with the housing and, on the other hand, with the pivot shaft. The damping device is arranged directly on the pivot shaft. It is no longer at the end of the piston drive facing away from the lever arm.

The damping device is connected with the housing and with the pivot shaft. This clarifies that the housing serves, or respectively is provided, as an abutment for a force exerted by the pivot shaft onto the damping device.

Thus, the damping device is situated directly on the pivot shaft. Accordingly, the actuating device, as a whole, is compact.

A further advantage of the disclosure is that the damping device, arranged on the pivot shaft, still functions if selectively the piston drive and/or the adjustment mechanism fails due to, for example, breakage.

The damping device further comprises a chamber with a movably mounted piston in the chamber. The chamber, in cross-section, has an overall circle segment of a circular ring shape. A central point of the circle segment coincides with the rotational axis of the pivot shaft. The piston divides the chamber into two partial chambers. Each partial chamber has a pressure medium connection. The pressure medium connections are connected with one another via a connecting line. A choke device is coupled with the connecting line. The choke device adjusts the through-flow quantity of pressure medium flowing through the connecting line. The damping device is arranged on an outer side of the housing. A depression in a wall of the housing receives the damping device. A cover covers the depression.

The actuating device according to the disclosure, including its advantageous further developments, is explained in further detail below with the aid of the illustration in the drawings of two example embodiments.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
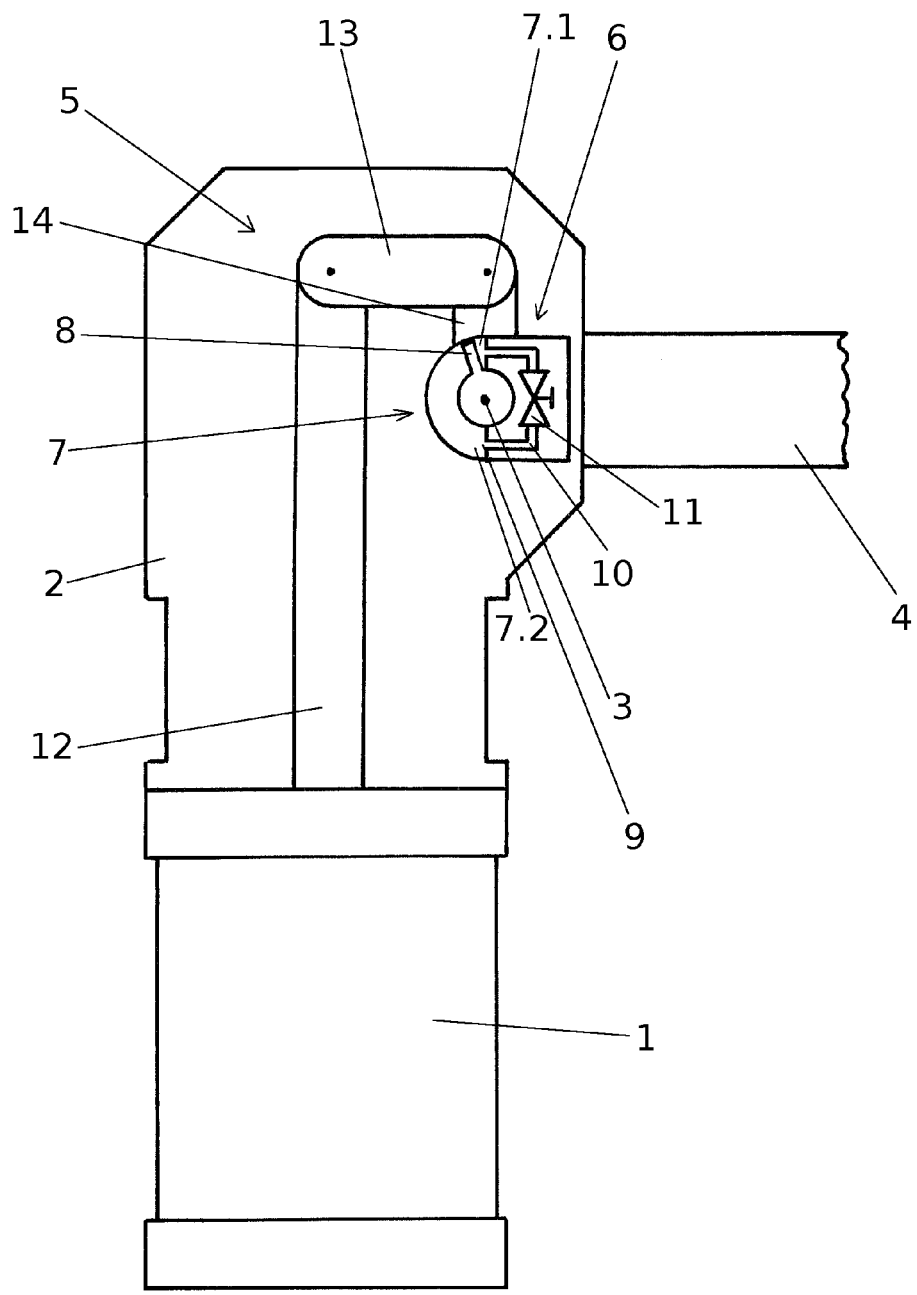
FIG. 1 is a partial section view of a first embodiment of an actuating device with a damping device on the pivot shaft of the lever arm.
Figure 2:
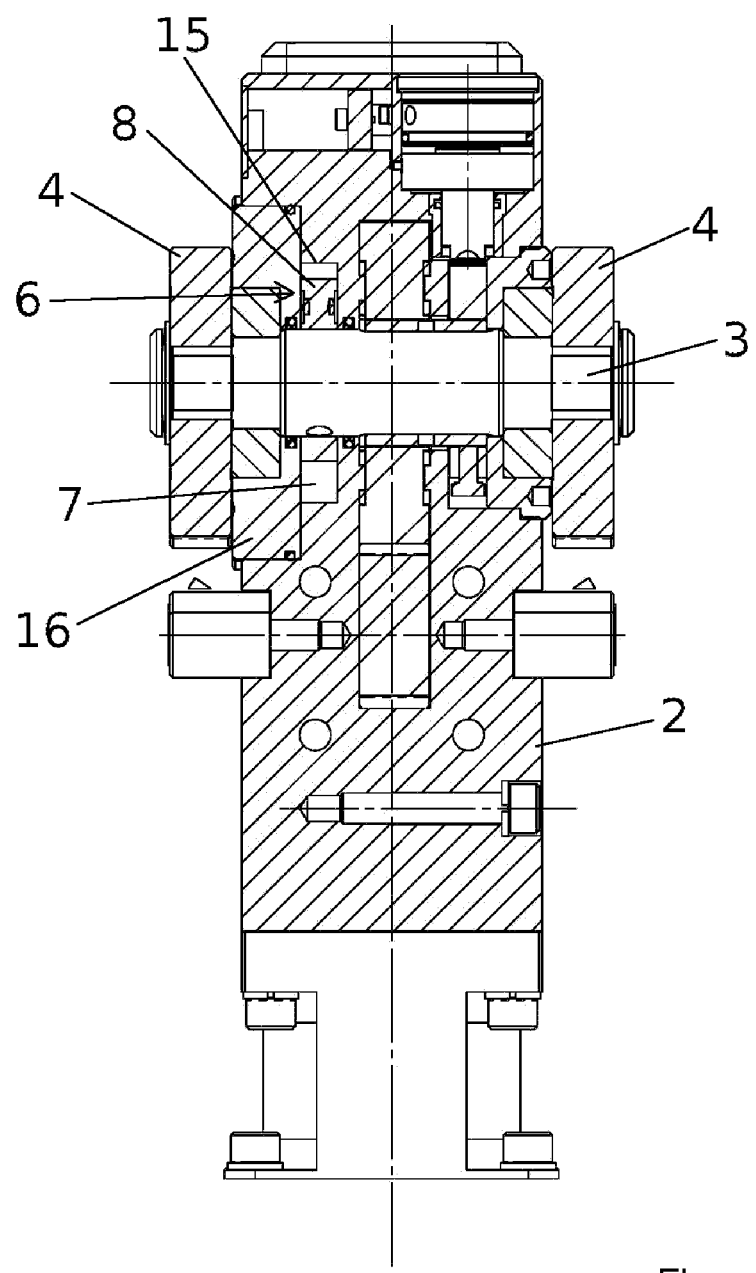
FIG. 2 is a section view parallel to the pivot shaft of a second embodiment of the actuating device according to the invention with a depression and a cover.

The actuating device illustrated diagrammatically in FIGS. 1 and 2, in particular a clamping or respectively pivot device, includes a linearly-movably constructed, fluidly operated piston drive 1. Preferably, it includes a pneumatic drive. In addition, the device includes a pivot shaft 3 movably rotatably mounted in a housing 2. A lever arm 4 is connected with the pivot shaft 3 in a torsionally rigid manner. An adjustment mechanism connects the piston drive 1 with the pivot shaft 3. A damping device 6 provides damping movement of the lever arm 4. The adjustment mechanism 5 is preferably constructed as a bent lever mechanism. The adjustment mechanism 5 is arranged in the housing 2.

The piston drive 1 has a piston rod 12. This piston rod 12 forms a part of the adjustment mechanism 5. The piston drive 1 is arranged on the housing 2. In addition, the housing 2 is formed in a manner known per se from two half shells. The pivot shaft 3 is arranged perpendicularly to a dividing plane of the two half shells. The adjustment mechanism 5 is arranged between the two half shells. Furthermore, each half shell has a through-opening (mounting) for the pivot shaft 3.

It is essential for the actuating device that the damping device 6 is constructed to be associated with the housing 2 and with the pivot shaft 3. In contrast to the previously known prior art, this measure has the advantage that the actuating device is compact in construction, despite the damping device 6.

In order to keep the damping device structure small, the damping device 6 includes a chamber 7 with a movably mounted piston 8. This piston 8 is connected with the pivot shaft 3 in a torsionally rigid manner. The chamber 7 is constructed, particularly preferably in cross-section, to have a shape of a circle segment or sector of a circular ring. The central point of the circle segment coincides with the rotational axis of the pivot shaft 3. The piston 8 is pivotable about the central point of the circle segment.

The "circle segment of a circular ring" means that the chamber 7, in cross-section, ultimately looks like a piece of cake with a missing point. In FIG. 1 the piece of cake corresponds to half a cake. The point has been removed in a semi-circular shape. Thus the actuating device functions correctly. Further measures are taken so that an opening angle of the circle segment, ultimately the angle of the piece of cake, corresponds to a maximum pivoting range of the lever arm 4.

Furthermore, the piston 8 divides the chamber 7 into two partial chambers 7.1, 7.2, partial pieces of cake. Each partial chamber 7.1, 7.2 is provided with a pressure medium connection 9 for a fluid pressure mechanism for example hydraulic oil. The pressure medium connections 9 are connected with one another via a connecting line 10. To adjust the degree of damping or, respectively, to adjust a through-flow quantity of pressure medium, the connecting line 10 includes a choke device 11. The through-flow cross-section of the choke device is adjustable.

As can be seen from FIGS. 1 and 2, the damping device 6 is arranged on an outer side or respectively, outer flank of the housing 2. Moreover, the dampening device 6 is arranged in a depression 15 on a wall of the housing 2. This depression 15 is, as shown in FIG. 2, provided with a cover 16.

The actuating device functions as follows:

FIG. 1 shows the actuating or respectively clamping device in a closed position. The piston of the pneumatic piston drive 1 is illustrated in phantom. It is situated at the upper end of the cylinder. When the piston is acted upon by compressed air, the piston of the piston drive 1 is pressed downwards. This, in turn, results in the piston rod 12 moving downwards. In so doing, the piston rod 12 pulls on the link 13 and, in turn, on the lever 14. The lever 14 is connected in a torsionally rigid manner with the pivot shaft 3. This type of adjustment mechanism is known as a bent lever mechanism.

The piston 8 of the damping device 6 is connected in a torsionally rigid manner with the pivot shaft 3. The rotation of the pivot shaft 3 leads to the piston 8 moving in a counter-clockwise direction in the chamber 7. In so doing, the pressure medium that is situated in the partial chamber 7.2 is pressed through the connecting line 10 into the choke device 11. According to the degree of opening of the choke device 11, the pressure medium can pass more or less quickly through the choke device 11. The pressure medium flows, via the connecting line 10, into the partial chamber 7.1. When the choke device 11 is closed, this ultimately leads to the pivot shaft 3 being blocked against pivoting.

If, for example, the piston rod 12 were to break, for whatever reason, a further undesired movement of the lever arm 4 would, in any case, be damped due to the damping device 6. This is due to the fact that the piston 8, in the chamber 7, can not move arbitrarily quickly due to the choke device 11 being in a closed position. The result is that it is of great advantage not to arrange the damping device 6 at the rear end of the piston drive 1, but rather directly on the pivot shaft 3.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The invention claimed is:

1. An actuating device comprising:
a linearly-movable, fluidly operated piston drive;
a pivot shaft, movably rotatably mounted in a housing;
a lever arm connected with the pivot shaft in a torsionally rigid manner;
an adjustment mechanism connects the piston drive with the pivot shaft; and
a damping device for damping movement of the lever arm, the damping device is positioned in the housing and the damping device directly on the pivot shaft.

2. The actuating device according to claim 1, wherein the damping device further comprises a chamber with a movably mounted piston in the chamber.

3. The actuating device according to claim 2, wherein the chamber, in cross-section, has an overall circle segment of a circular ring shape, where a central point of the circle segment coincides with the rotational axis of the pivot shaft.

4. The actuating device according to claim 2, wherein the piston divides the chamber into two partial chambers.

5. The actuating device according to claim 4, wherein each partial chamber has a pressure medium connection.

6. The actuating device according to claim 5, wherein the pressure medium connections are connected with one another via a connecting line.

7. The actuating device according to claim 6, further comprising a choke device coupled with the connecting line, the choke device adjusts a through-flow quantity of pressure medium flowing through the connecting line.

8. The actuating device according to claim 1, wherein the damping device is arranged on an outer side of the housing.

9. The actuating device according to claim 1, further comprising a depression in a wall of the housing for receiving the damping device.

10. The actuating device according to claim 9, further comprising a cover covering the depression.

* * * * *